US012503884B2

(12) United States Patent
Ali et al.

(10) Patent No.: US 12,503,884 B2
(45) Date of Patent: *Dec. 23, 2025

(54) MORTISE AND MULTIPOINT LATCHING ASSEMBLY

(71) Applicant: Schlage Lock Company LLC, Carmel, IN (US)

(72) Inventors: Mohammed Maksood Ali, Bangalore (IN); Sushanth A Kondi, Bangalore (IN); Kemparaju Putaswamy, Bangalore (IN); Matthew S. Graham, Noblesville, IN (US); Michael D. Coleman, Noblesville, IN (US)

(73) Assignee: Schlage Lock Company LLC, Carmel, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/675,542

(22) Filed: May 28, 2024

(65) Prior Publication Data
US 2024/0309678 A1    Sep. 19, 2024

Related U.S. Application Data

(63) Continuation of application No. 15/967,972, filed on May 1, 2018, now Pat. No. 11,993,954, which is a
(Continued)

(51) Int. Cl.
E05B 53/00    (2006.01)
E05B 63/00    (2006.01)
(Continued)

(52) U.S. Cl.
CPC ........ *E05B 53/003* (2013.01); *E05B 63/0056* (2013.01); *E05B 63/08* (2013.01);
(Continued)

(58) Field of Classification Search
CPC ...... E05B 53/00; E05B 53/003; E05B 53/005; E05B 65/10; E05B 65/1006;
(Continued)

(56) References Cited

U.S. PATENT DOCUMENTS 140,307 A     6/1873  Rand
443,418 A    12/1890  Wallace
(Continued)

FOREIGN PATENT DOCUMENTS

CA    3004573 A1       2/2013
DE    3417054 A1 *    11/1985  ............... E05C 7/04
(Continued)

OTHER PUBLICATIONS

Canadian First Office Action; Canadian Intellectual Property Office; Canadian Application No. 2,896,489; Jul. 12, 2016; 5 pages.
(Continued)

*Primary Examiner* — Christine M Mills
*Assistant Examiner* — Peter H Watson
(74) *Attorney, Agent, or Firm* — Taft Stettinius & Hollister LLP

(57) ABSTRACT

In one form, a multipoint locking assembly includes a first latch device, a second latch device, and a mortise assembly coupled to the first and second latch devices. The mortise assembly may comprise a first transmission coupled to the first latch device via a first flexible member, a second transmission coupled to the second latch device via a second flexible member, and an actuation assembly operable to actuate the first and second transmissions. At least one of the transmissions comprises a slack removal device operable to remove slack in the flexible member to which it is coupled, thereby ensuring proper transmission of pulling forces between the transmission and the latch device.

20 Claims, 7 Drawing Sheets

Related U.S. Application Data continuation of application No. 14/324,016, filed on Jul. 3, 2014, now Pat. No. 9,957,734.

(51) Int. Cl.
| | | |
|---|---|---|
| *E05B 63/08* | (2006.01) | |
| *E05B 63/14* | (2006.01) | |
| *E05B 63/18* | (2006.01) | |
| *E05C 9/00* | (2006.01) | |
| *E05C 9/04* | (2006.01) | |
| *E05C 9/20* | (2006.01) | |

(52) U.S. Cl.
CPC .............. *E05B 63/14* (2013.01); *E05B 63/18* (2013.01); *E05C 9/00* (2013.01); *E05C 9/04* (2013.01); *E05C 9/042* (2013.01); *E05C 9/20* (2013.01); *Y10S 292/60* (2013.01)

(58) Field of Classification Search
CPC .. E05B 65/1013; E05B 63/0056; E05B 63/08; E05B 63/14; E05B 63/16; E05B 63/18; E05B 63/185; E05B 63/20; E05B 63/202; E05C 9/00; E05C 9/002; E05C 9/04; E05C 9/042; E05C 9/043; E05C 9/10; E05C 9/14; E05C 9/16; E05C 9/20; E05C 9/22; Y10T 292/08; Y10T 292/0801; Y10T 292/083; Y10T 292/0841; Y10T 292/0855; Y10T 292/0908; Y10T 292/0909; Y10T 292/091; Y10T 292/0931; Y10T 292/0992; Y10T 292/1017; Y10T 292/1057; Y10S 292/60; Y10S 292/65

See application file for complete search history.

(56) References Cited

U.S. PATENT DOCUMENTS

| | | | |
|---|---|---|---|
| 2,238,266 | A | 4/1941 | Johnson |
| 2,319,612 | A | 5/1943 | Lichtfeldt |
| 3,563,585 | A | 2/1971 | Welch |
| 3,583,740 | A | 6/1971 | Armstrong |
| 3,600,022 | A | 8/1971 | Armstrong |
| 3,965,564 | A | 6/1976 | Slovensky, Jr. |
| 4,601,499 | A | 7/1986 | Kim |
| 4,881,765 | A | 11/1989 | Heid |
| 5,016,931 | A | 5/1991 | Jackson |
| 5,042,851 | A | 8/1991 | Hunt |
| 5,154,454 | A | 10/1992 | Hollaway |
| 5,590,917 | A | 1/1997 | Brooks et al. |
| 5,688,000 | A | 11/1997 | Dolman |
| 5,688,002 | A | 11/1997 | Riley et al. |
| 5,730,014 | A | 3/1998 | Berger et al. |
| 5,816,017 | A | 10/1998 | Hunt et al. |
| 5,820,173 | A | 10/1998 | Fuller |
| 5,864,936 | A | 2/1999 | Riley et al. |
| 6,120,071 | A | 9/2000 | Picard et al. |
| 6,174,004 | B1 | 1/2001 | Picard et al. |
| 6,217,076 | B1 | 4/2001 | Fuller |
| 6,557,909 | B2 | 5/2003 | Morris |
| 6,820,905 | B1 | 11/2004 | Haeck et al. |
| 7,152,889 | B2 | 12/2006 | Jeffries |
| 7,404,306 | B2 | 7/2008 | Walls et al. |
| 7,748,757 | B2 | 7/2010 | Shen |
| 7,788,954 | B2 | 9/2010 | Schumm |
| 7,946,080 | B2 | 5/2011 | Ellerton et al. |
| 8,267,440 | B2 | 9/2012 | Shen |
| 9,957,734 | B2 * | 5/2018 | Ali ...................... E05B 63/0056 |
| 11,993,954 | B2 * | 5/2024 | Ali .......................... E05B 63/08 |
| 2007/0273158 | A1 | 11/2007 | Berger |
| 2010/0066102 | A1 | 3/2010 | Shen |
| 2010/0289275 | A1 | 11/2010 | Marks et al. |
| 2012/0074714 | A1 | 3/2012 | Saccon |
| 2012/0248789 | A1 | 10/2012 | Mattrisch |
| 2013/0097938 | A1 * | 4/2013 | Madrid ................. E05B 63/143 49/506 |
| 2013/0154283 | A1 | 6/2013 | Arlinghaus et al. |

FOREIGN PATENT DOCUMENTS

| | | |
|---|---|---|
| EP | 1524390 A2 | 4/2005 |
| EP | 1524398 A2 | 4/2005 |
| FR | 2298667 A1 | 8/1976 |
| FR | 2826683 A1 | 1/2003 |
| GB | 2155092 A | 9/1985 |
| GB | 2298450 A | 9/1996 |

OTHER PUBLICATIONS

Canadian Office Action; Canadian Intellectual Property Office; Canadian Patent Application No. 3,100,948; Jul. 18, 2022; 3 pages.
Canadian Office Action (Second); Canadian Intellectual Property Office; Canadian Patent Application No. 2,986,745; May 24, 2019; 4 pages.
Canadian Office Action; Canadian Intellectual Property Office; Canadian Patent Application No. 3,100,948; Mar. 18, 2022; 4 pages.
Canadian Office Action (Second); Canadian Intellectual Property Office; Canadian Patent Application No. 2,986,745; May 27, 2020; 3 pages.
Canadian Office Action; Canadian Patent Office; Canadian Patent Application No. 2,986,745; Oct. 12, 2018; 7 pages.

* cited by examiner

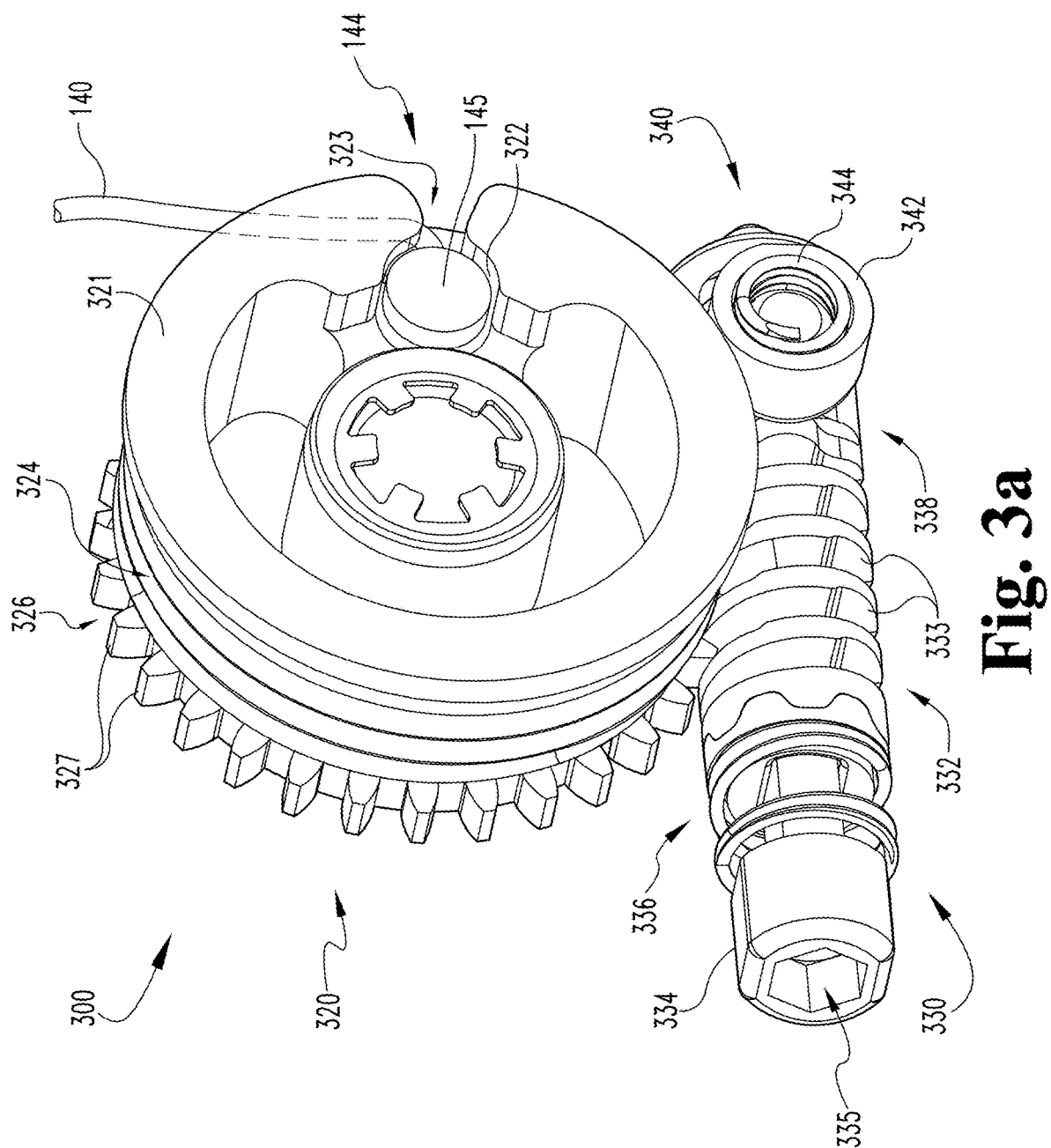

MORTISE AND MULTIPOINT LATCHING ASSEMBLY

CROSS-REFERENCE TO RELATED APPLICATIONS

The present application is a continuation of U.S. patent application Ser. No. 15/967,972 filed May 1, 2018 and issued as U.S. Pat. No. 11,993,954, which is a continuation of U.S. patent application Ser. No. 14/324,016 filed on Jul. 3, 2014 and issued as U.S. Pat. No. 9,957,734, the contents of each application hereby incorporated by reference in their entirety.

TECHNICAL FIELD

The present invention generally relates to multipoint latching systems, and more particularly, but not exclusively, to multipoint latching systems where the latch operating system is concealed within the door.

BACKGROUND

Multipoint latching systems are often used to secure a door to a doorframe at multiple locations. Some such systems suffer from a variety of limitations, including those relating to aesthetics, ease of installation, adjustability, and other drawbacks. Therefore, a need remains for further improvements in multipoint latching systems.

SUMMARY

In one form, a multipoint locking assembly includes a first latch device, a second latch device, and a mortise assembly coupled to the first and second latch devices. The mortise assembly may comprise a first transmission coupled to the first latch device via a first flexible member, a second transmission coupled to the second latch device via a second flexible member, and an actuation assembly operable to actuate the first and second transmissions. At least one of the transmissions comprises a slack removal device operable to remove slack in the flexible member to which it is coupled, thereby ensuring proper transmission of pulling forces between the transmission and the latch device. Further embodiments, forms, features, aspects, benefits, and advantages of the present application shall become apparent from the description and figures provided herewith.

BRIEF DESCRIPTION OF THE FIGURES

FIGS. 3a and 3b are perspective and side elevational illustrations, respectively, of a portion of one embodiment of a spool assembly utilized in the exemplary chassis.

DETAILED DESCRIPTION OF ILLUSTRATIVE EMBODIMENTS

Figure 1:
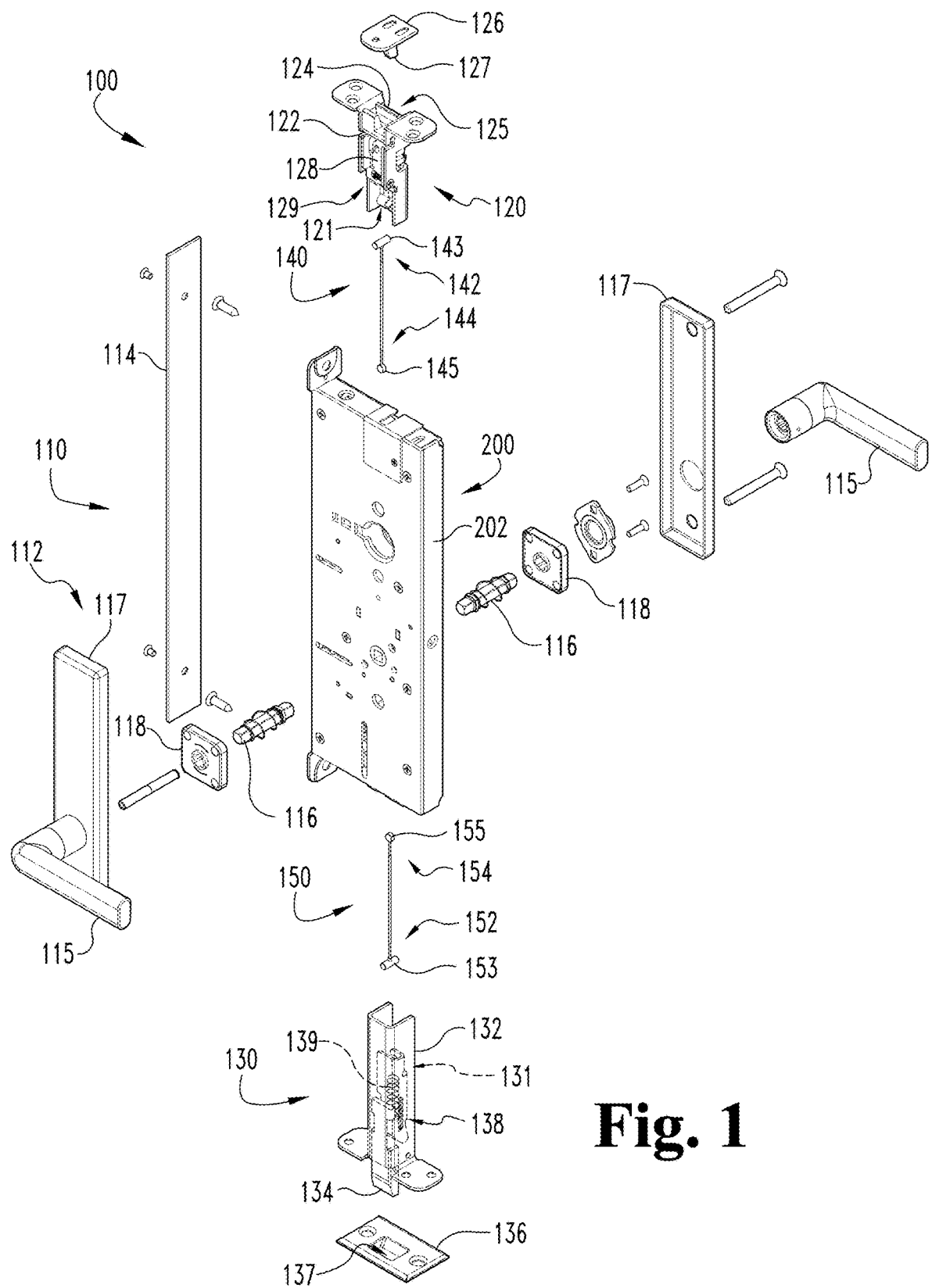
FIG. 1 is an exploded assembly view of an illustrative multipoint locking assembly according to one embodiment of the invention.

For the purposes of promoting an understanding of the principles of the invention, reference will now be made to the embodiments illustrated in the drawings and specific language will be used to describe the same. It will nevertheless be understood that no limitation of the scope of the invention is thereby intended. Any alterations and further modifications in the described embodiments, and any further applications of the principles of the invention as described herein are contemplated as would normally occur to one skilled in the art to which the invention relates.

As used herein, "inward" is the direction of retraction or actuation, and "outward" is the direction of extension. Lateral movement is movement in a lateral direction or substantially parallel to a lateral axis of the system, and longitudinal movement is movement in a longitudinal direction or substantially along a longitudinal axis of the system. As such, retraction or actuation of a laterally movable element is "laterally inward", while retraction or actuation of a longitudinally movable element is "longitudinally inward". In the embodiments illustrated herein, the lateral axis is a horizontal or substantially horizontal axis, and the longitudinal axis is a vertical or substantially vertical axis. In other embodiments, these orientations may be reversed, or the lateral and longitudinal axes may be offset from vertical and horizontal axes by oblique angles.

With reference to FIG. 1, an exemplary multipoint locking system 100 includes a mortise assembly 110, a top latch device 120, a bottom latch device 130, an upper flexible connector (depicted herein as a cable 140) connecting the top latch device 120 and the mortise assembly 110, and a lower flexible connector (depicted herein as a cable 150) connecting the bottom latch device 130 and the mortise assembly 110. As described hereinafter, the exemplary flexible connectors comprise unidirectional force transfer members, such as pull cables 140, 150.

The exemplary mortise assembly 110 includes inner and outer handle assemblies 112, a faceplate 114, and a chassis 200 including a casing 202. Each of the handle assemblies 112 includes a manual actuator, such as a handle 115 coupled to a spindle 116, and may further include an escutcheon 117 and/or a spring cage 118. In the illustrated form, the mortise assembly 110 is a lever-by-lever mortise assembly, wherein each of the handles 115 comprises a lever. It is also contemplated that one or both of the handles 115 may comprise another form of actuator, such as a knob. In other forms, one of the handle assemblies 112 may be omitted, such that, when installed, the system 100 is operable from only one side.

The top latch device 120 includes a coupling portion 121 configured to engage the upper cable 140, a housing 122, and a closure fastener such as a latch 124 movably coupled to the housing 122. The top latch device 120 is operable in an extended or latching state wherein the top latch device 120 may secure the door in a closed position. In the latching state, the latch 124 is in an extended, latching position, wherein the latch 124 extends from the housing 122 and may engage a strike 126, which may be mounted in a door frame. The top latch device 120 is also operable in a retracted or unlatching state, wherein the door may be opened. In the unlatching state, the latch 124 is in a retracted, unlatching position, wherein the latch 124 is positioned substantially or entirely within the housing 122.

While other forms are contemplated, in the illustrated form, the movable coupling between the housing 122 and the latch 124 is a pivoting coupling, such that the top latch 124 pivots between the extended and retracted positions. The exemplary top latch 124 is a substantially U-shaped latch including a channel 125, and the illustrative strike 126 includes a protrusion 127 configured to be received in the channel 125. When the top latch 124 is in the retracted position and the door is open, the latch 124 is not engaged with the strike 126. As the door is closed, the protrusion 127 engages the latch 124, urging the latch to the extended position; when the door is fully closed, the protrusion 127 is seated in the channel 125, and the top latch device 120 retains the door in the closed position.

In the illustrated form, the top latch device 120 further includes a blocking member 128 movably coupled to the housing 122. The blocking member 128 is operable in an unblocking position wherein the top latch 124 may pivot from the extended position to the retracted position, and a blocking position wherein the blocking member 128 prevents the latch 124 from pivoting to the retracted position. The latch 124 may be biased toward the retracted position. For example, the latch 124 may be biased by a spring or by gravity such that, when the latch 124 is not engaged with the strike 126 and the blocking member 128 is in the unblocking position, the latch 124 moves toward the retracted position. When the latch 124 is in the retracted position, the blocking member 128 may be prevented from moving from the unblocking position to the blocking position. The top latch device 120 may further include a biasing member or spring 129 associated with the blocking member 128, such that the blocking member 128 is biased toward the blocking position. In such forms, when the latch 124 transitions from the retracted position to the extended position, the blocking member 128 is urged toward the blocking position by the biasing force of the spring 129.

As a result of the aforementioned features of the top latch 124 and the blocking member 128, the illustrated top latch device 120 is operable in an unlatched state, a locked latched state, and an unlocked latched state. In the unlatched state, the latch 124 is in the unlatched or retracted position, and the blocking member 128 is retained in the unblocking position. In the unlocked latched state, the blocking member 128 is in the unblocking position, and the latch 124 is movable between the extended latching position and the retracted unlatching position. In the locked latched state, the blocking member 128 is in the blocking position, and the latch 124 is retained in the extended latching position.

In the illustrated form, the coupling portion 121 is connected to or integrally formed with the blocking member 128 such that, when the upper cable 140 is attached to the coupling portion 121, the biasing force of the spring 129 is translated to the cable 140. In other forms, the top latch device 120 may not necessarily include the spring 129, for example in embodiments in which the coupling portion 121 is connected to or integrally formed with the top latch 124.

The bottom latch device 130 includes a coupling portion 131 configured to engage the lower cable 150, a housing 132, and a closure fastener such as a bolt 134 movably coupled to the housing 132. The bottom latch device 130 is operable in an extended or latching state wherein the bottom latch device 130 may secure the door in a closed position. In the latching state, the bolt 134 is in an extended or locking position, wherein the bolt 134 extends from the housing 132. A strike 136 including a recess 137 may be mounted in a bottom portion of a door frame, such that when the door is closed and the bolt 134 is in the extended position, the bolt 134 is received in the recess 137. The bottom latch device 130 is also operable in a retracted or unlatching state, wherein the bolt 134 is in a retracted or unlocking position. When in the unlocking position, the bolt 134 is positioned substantially or entirely within the housing 132, and the door can be opened.

While other forms are contemplated, in the illustrated embodiment, the movable coupling between the bottom housing 132 and the bottom bolt 134 is a sliding coupling, such that the bottom bolt 134 moves substantially linearly between the extended and retracted positions. Additionally, the illustrated bottom latch device 130 includes deadlocking features 138 configured to prevent external forces from moving the bolt 134 from the extended position to the retracted position. The bottom latch device 130 may further include a biasing member or spring 139 associated with the bolt 134, such that the bolt 134 is biased toward the extended position. In the illustrated form, the coupling portion 131 is an intermediate element coupling the lower bolt 134 and the lower cable 150 such that, when the lower cable 150 is attached to the coupling portion 131, the biasing force of the spring 139 is translated to the cable 150. In other forms, the bottom latch device 130 may not necessarily include the spring 139, and the bottom bolt 134 may be biased toward the extended position by gravitational forces.

Each of the cables 140, 150 comprises a first end portion 142, 152 configured to engage the corresponding latch device 120, 130, and a second end portion 144, 154 configured to engage the chassis 200. For example, the first end portions 142, 152 may comprise a coupling member such as a peg 143, 153, and the latch device coupling portions 121, 131 may be configured to matingly engage the corresponding peg 143, 153. The second end portions 144, 154 may comprise a coupling member such as a tab 145, 155 and the chassis 200 may include features which matingly engage the corresponding tab 145, 155. As described in further detail below, the illustrated cables 140, 150 are substantially identical bare cables, and may be utilized with any of a plurality of doors having varying dimensions.

In the illustrated embodiment, the upper cable 140 is coupled to the blocking member 128 by engagement of the coupling portion 121 and the peg 143, and is biased longitudinally outward (i.e., in the direction of extension) by the spring 129. As the cable 140 is retracted by the chassis 200, the blocking member 128 is moved from the blocking position to the unblocking position, enabling the top latch 124 to pivot toward the retracted position. As the top latch 124 pivots from the retracted position to the extended position (for example, due to engagement with the strike 126 as the door is closed), the spring 129 urges the blocking member 128 toward the blocking position. As the blocking member 128 moves toward the blocking position, the cable 140 is pulled longitudinally outward, or toward the top latch device 120. In other forms, the first end portion 142 may be coupled to another portion of the top latch device 120, such as the top latch 124.

In the illustrated embodiment, the lower cable 150 is coupled to the bottom bolt 134, and is biased longitudinally outward (i.e., in the direction of extension) by the spring 139. While in the illustrated form, the coupling portion 131 is an intermediate element between the bolt 134 and the lower cable 150, it is also contemplated that the coupling portion 131 may be integrally formed with the bolt 134, such that the bolt 134 is directly engaged with the peg 153. As the cable 150 is retracted by the chassis 200, the bolt 134 is pulled into the housing 132 toward the retracted position. With the bolt 134 in the retracted position, the spring 139 pulls on the cable 150, urging the cable 150 longitudinally outward or toward the bottom latch device 130.

In the illustrated form, the movable coupling between the top housing 122 and the top latch 124 is a pivoting coupling, while the movable coupling between the bottom housing 132 and the bottom bolt 134 is a sliding coupling. It is also contemplated that one or more of the movable couplings between the housings 122, 132 and the respective closure fastener 124, 134 may be of another form, such as a sliding coupling, a pivoting coupling, a rotary coupling, or a combination thereof. Additionally, one or more of the movable couplings may comprise a direct coupling between the housing 122, 132 and the respective closure fastener 124, 134, or the coupling may be include intermediate elements.

Figure 2:
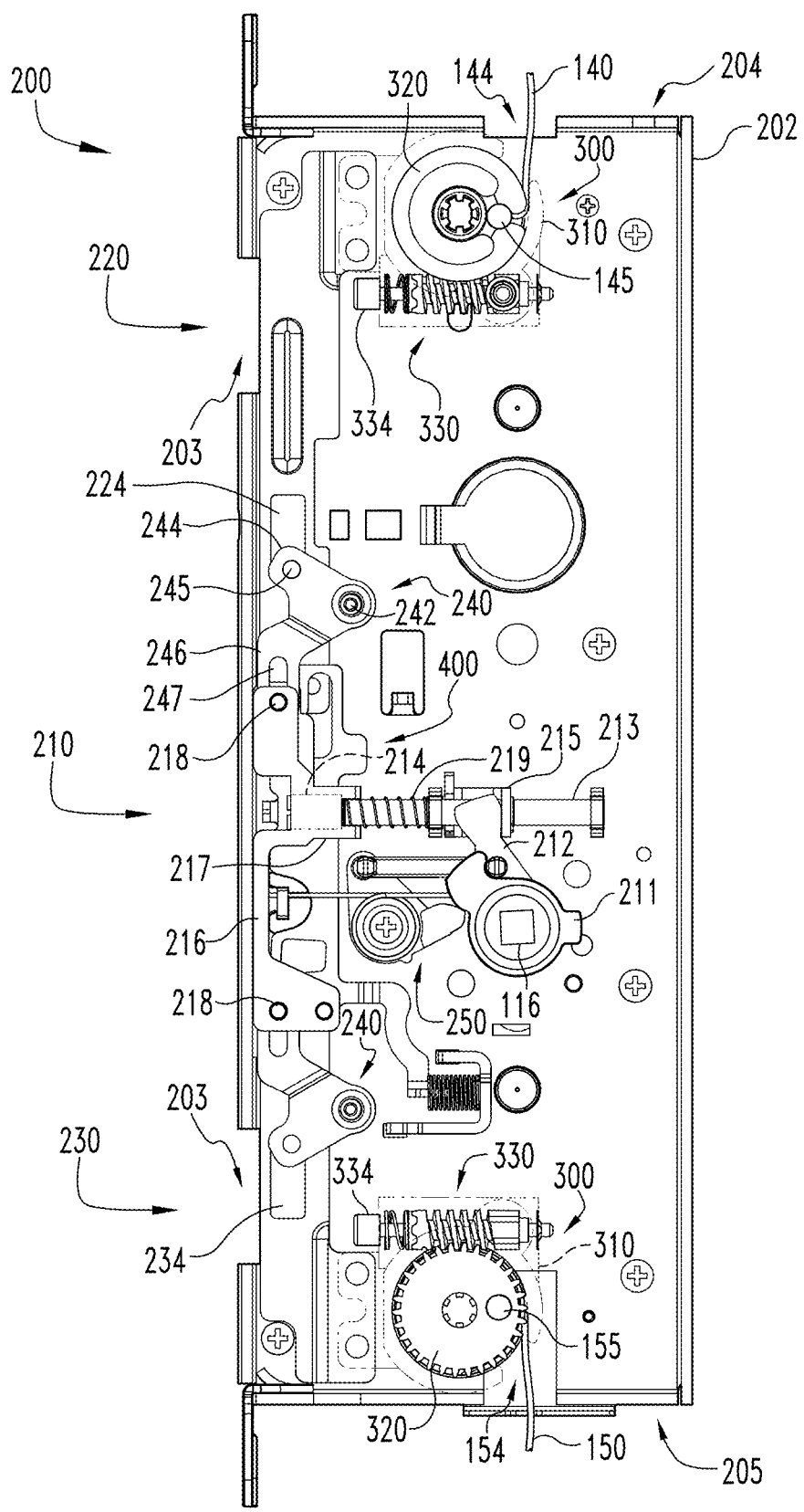
FIG. 2 is an elevational illustration of an exemplary chassis in a locking state.

With additional reference to FIG. 2, the chassis 200 includes an actuation assembly 210 operably coupled with the handles 115, an upper transmission 220 connected to the top latch device 120 via the upper cable 140, and a lower transmission 230 connected to the bottom latch device 130 via the lower cable 150. Each of the illustrated transmissions 220, 230 includes a bell crank 240 coupling the actuation assembly 210 to the corresponding transmission 220, 230, and a slack removal device or spool assembly 300 coupling the transmissions 220, 230 to the corresponding cable 140, 150. As described in further detail below, the chassis 200 may further include a hold-open assembly 400 configured to prevent one of the latch devices 120, 130 from prematurely transitioning from the retracted state to the extended state.

In the illustrated form, the chassis 200 is configured to translate a rotational input (e.g., of the handles 115) to longitudinal (e.g., vertical) movement of the transmissions 220, 230. It is also contemplated that the chassis 200 may be configured to cause longitudinal movement of the transmissions 220, 230 in response to another form of input. The input may be a mechanical input, such as a linear or pivotal motion of an actuator, which may be performed manually. In other forms, the input may be an electrical input such as a command or signal, and the chassis 200 may comprise an electrical or electromechanical actuator which moves the transmissions 220, 230 in response to the electrical input.

As described in further detail below, during operation of the exemplary system 100, rotation of either of the handles 115 actuates the actuation assembly 210, which urges the transmissions 220, 230 toward one another. As the upper and lower transmissions 220, 230 move toward one another, the cables 140, 150 are pulled toward the chassis 200, urging the blocking member 128 toward the unblocking position, and urging the bottom bolt 134 toward the retracted position.

The exemplary actuation assembly 210 includes a hub 211 rotationally coupled with at least one of the spindles 116, a pawl 212 rotationally coupled with the hub 211, a drive rod 213 including a head 214, and a bracket 215 positioned on the drive rod 213 adjacent to the pawl 212. The assembly 210 further comprises a clevis 216, which is positioned adjacent to the drive rod head 214. The clevis 216 may include an opening 217 through which the drive rod 213 extends. During assembly, the drive rod 213 may be passed through the opening 217, and the head 214 may be attached to the drive rod 213 such that lateral motion of the drive rod 213 causes a corresponding lateral motion of the clevis 216. The clevis 216 is coupled to the upper and lower bell cranks 240, for example via rivets or pins 218. The actuation assembly 210 may further comprise a biasing device 219 engaged with the pawl 212, such that the pawl 212 is biased toward an extended or unactuated position.

The upper transmission 220 includes an upper link plate 222 slidingly coupled to the casing 202, a bell crank 240 coupling the clevis 216 and the link plate 222, and a spool assembly 300 coupled to the link plate 222 and the upper cable 140. The lower transmission 230 is substantially similar to upper transmission 220, and includes a lower link plate 232 slidingly coupled to the casing 202, a bell crank 240 coupling the clevis 216 and the link plate 232, and a spool assembly 300 coupled to the link plate 232 and the lower cable 150. The upper link plate 222 may include an upper link plate channel 224, and the lower link plate 232 may include a lower link plate channel 234.

Each of the bell cranks 240 is pivotally mounted to the casing 202, for example by a pivot pin 242, and is configured to translate lateral (e.g., horizontal) motion of the clevis 216 to longitudinal (e.g., vertical) motion of the corresponding link plate 222, 232. The bell cranks 240 include a first portion or arm 244 engaged with the corresponding link plate 222, 232, and a second portion or arm 246 engaged with the clevis 216. The engagement between the link plates 222, 232, the bell cranks 240, and the clevis 216 may comprise lost motion connections. For example, the first arm 244 may include a rivet or pin 245 extending into the corresponding link plate channel 224, 234, forming a lost motion connection between the bell cranks 240 and the corresponding link plates 222, 232. The second arm 246 may include a channel 247 into which one of the clevis pins 218 extends, forming a lost motion connection between the bell cranks 240 and the clevis 216.

The exemplary spool assemblies 300 include a housing 310, a spool 320 received in the housing 310, an adjustment device 330 operable to selectively rotate the spool 320, and a retaining device 340 operable to selectively prevent rotation of the spool 320. Each of the spools 320 is coupled to the corresponding cable 140, 150, such that each of the latch devices 120, 130 is operably connected to the corresponding transmission 220, 230.

Figure 3B:
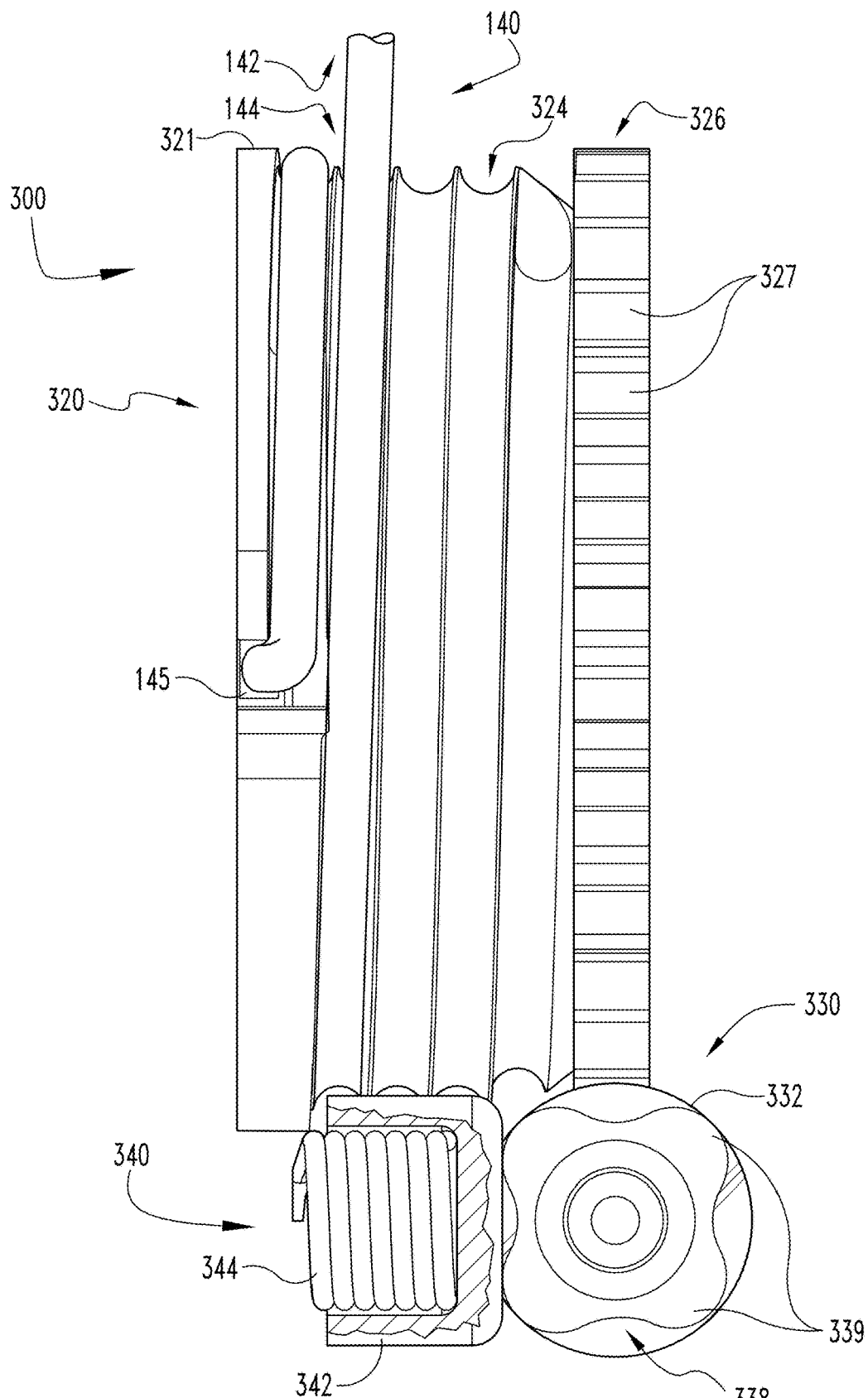

FIGS. 3a and 3b depict the spool assembly 300 of the upper transmission 220, along with a portion of the upper cable 140. For purposes of clarity, the housing 310 is not depicted. While the following description is made with reference to the upper spool assembly 300 and the upper cable 140, it is to be appreciated that the elements and features described hereinafter are equally applicable to the lower spool assembly 300 and lower cable 150.

The spool 320 includes a substantially circular cylindrical body 321, which may include a cutout 322 configured to receive the tab 145 and an opening 323 having a width corresponding to the diameter of the cable 140. In such forms, the cable 140 may be coupled to the spool assembly 300 by positioning the tab 145 in the cutout 322 such that the cable 140 extends through the opening 323. The spool 320 may then be rotated, such that the second end portion 144 is wound onto the spool 320, while the first end portion 142 remains free. In other words, the first end portion 142 may comprise a free portion of the cable 140 which is not wound about the spool 320, and the second end portion 144 may comprise a wound or spooled portion of the cable 140 which is wound onto the spool 320. The spool 320 may further include a helical channel 324 configured to receive the cable 140 when the second end portion 144 is wound onto the spool 320. The illustrated spool 320 further includes gear portion 326 comprising a plurality of radially extending gear teeth 327.

The exemplary adjustment device 330 comprises a worm 332 including threads 333, and a head 334 coupled to the worm 332, for example through a slip clutch 336. The threads 333 are meshingly engaged with the teeth 327, such that rotation of the worm 332 causes the spool 320 to rotate as the threads 333 urge the teeth 327 in a direction corresponding to the rotational direction of the worm 332. In the illustrated form, the distal end of the worm 332 includes a lobed portion 338 including a plurality of angularly spaced cams or radial lobes 339. The head 334 may include an engagement feature such as a hex opening 335 through which a user with an appropriate adjustment tool may rotate the head 334. The head 334 may be aligned with an opening 203 in the side of casing 202 (FIG. 2), such that the head 334 is accessible through the opening 203 when the faceplate 114 is not installed.

Rotation of the spool 320 in a tightening direction may cause the cable 140 to wind onto the spool 320, while rotation of the spool 320 in a loosening direction may cause the cable 140 to unwind from the spool 320. Thus, a user can adjust the effective length of the cable 140 (that is to say, the length of the free portion or first end portion 142, which is not wound onto the spool 320) by rotating the worm 332 in the appropriate direction. As will be appreciated, if the spool 320 were to rotate in the loosening direction after installation of the system 100, the cable 140 would slacken, risking malfunctioning of the system 100. To mitigate such risk, the spool assembly 300 includes the retaining device 340, which retains the spool 320 in the rotational position selected by the user.

The retaining device 340 is configured to selectively retain the worm 332 in a plurality of discrete rotational positions. In the illustrated form, the retaining device 340 includes a retaining member 342 and a biasing member in the form of a spring 344. The retaining member 342 is positioned in the housing 310 adjacent to the lobed portion 338, and the spring 344 urges the retaining member into contact with the lobed portion 338. FIG. 3b illustrates the spool assembly 300 with the worm 332 in one of the discrete rotational positions and the retaining member 342 in a first position, to which it is biased by the spring 344. In the first position, the retaining member 342 engages two of the lobes 339.

When the worm 332 is rotated, a leading edge of one of the lobes 339 engages the retaining member 342 and urges the retaining member 342 away from the first position against the force of the spring 344. As the worm 332 continues to rotate, the retaining member 342 travels along the lobe 339 from the leading edge to a radial apex of the lobe 339, at which point the retaining member 342 is in a second position. Continued rotation of the worm 332 causes the retaining member to travel from the apex to a trailing edge of the lobe 339, at which point the biasing force of the spring 344 urges the worm 332 to the next discrete position.

As will be appreciated, in order to rotate the worm 332, the torque applied thereto must be sufficient to urge the retaining member 342 away from the first position against the biasing force of the spring 344. When a sufficient torque is applied to the worm 332, the worm 332 rotates, and the retaining member 342 reciprocates between first and second positions as it travels along the lobes 339. In the absence of such a torque, the retaining device 340 prevents rotation of the worm 332 from the discrete rotational position, thereby preventing rotation of the spool 320, and maintaining the cable 140 at the effective length selected by the user.

As will be appreciated, the illustrated lobed portion 338 comprises four lobes 339, defining four discrete rotational positions of the worm 332. It is also contemplated that the lobed portion 338 may comprise more or fewer cams or lobes 339, resulting in a corresponding number of discrete rotational positions. It is further to be appreciated that the amount by which the effective length of the cable 140 is adjusted by rotation of the worm 332 from one discrete position to the next depends upon a number of factors, such as the angular offset between each of the discrete positions, the pitch of the threads 333, and the relative radii of the gear portion 326 and the worm 332. One having skill in the art will therefore may provide appropriate tolerances for slack in the cable 140 by appropriate consideration of these factors.

Figure 4:
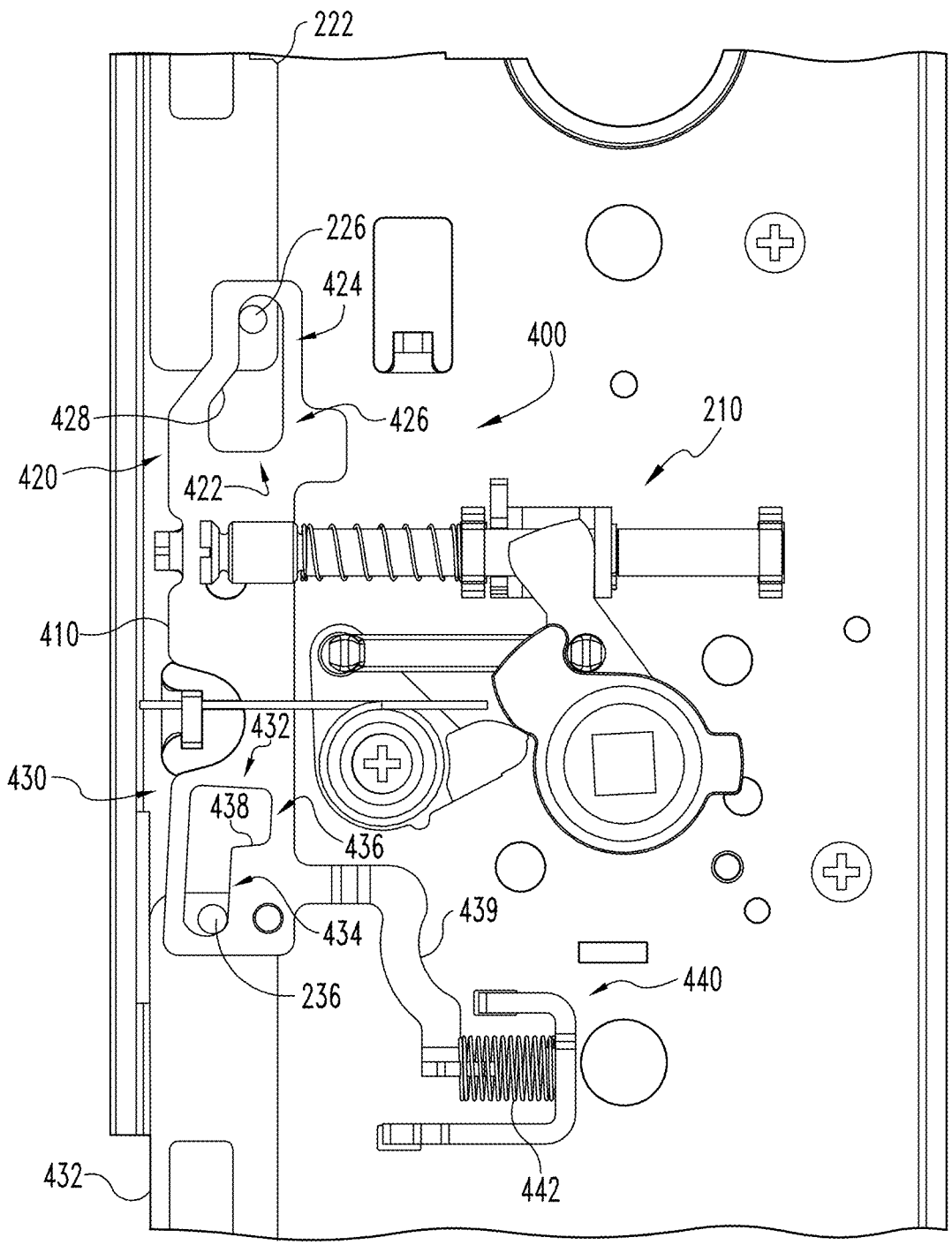
FIG. 4 is an illustration of one embodiment of a hold-open assembly in a releasing position.

With additional reference to FIG. 4, the illustrated chassis 200 also includes a hold-open assembly 400 including a tilting link 410 which is pivotal with respect to the casing 202. The tilting link 410 is operable in a first, holding position and a second, releasing position. The tilting link 410 includes upper arm 420 engaged with the upper transmission 220, and a lower arm 430 engaged with the lower transmission 230. The hold-open assembly 400 may further include a biasing assembly 440 including a biasing element such as a spring 442 configured to bias the tilting link 410 toward the holding position.

The upper arm 420 includes an opening 422 comprising a channel 424, an enlarged portion 426, and a cam surface such as a ramp 428. The upper link plate 222 may include a rivet or pin 226 extending into the opening 422. The lower arm 430 includes an opening 432 comprising a channel 434, an enlarged portion 436, and a ledge 438. The lower link plate 232 may include a rivet or pin 236 extending into the opening 432. Further features and details regarding the hold-open assembly 400 and the functions thereof are described below.

Figure 5:
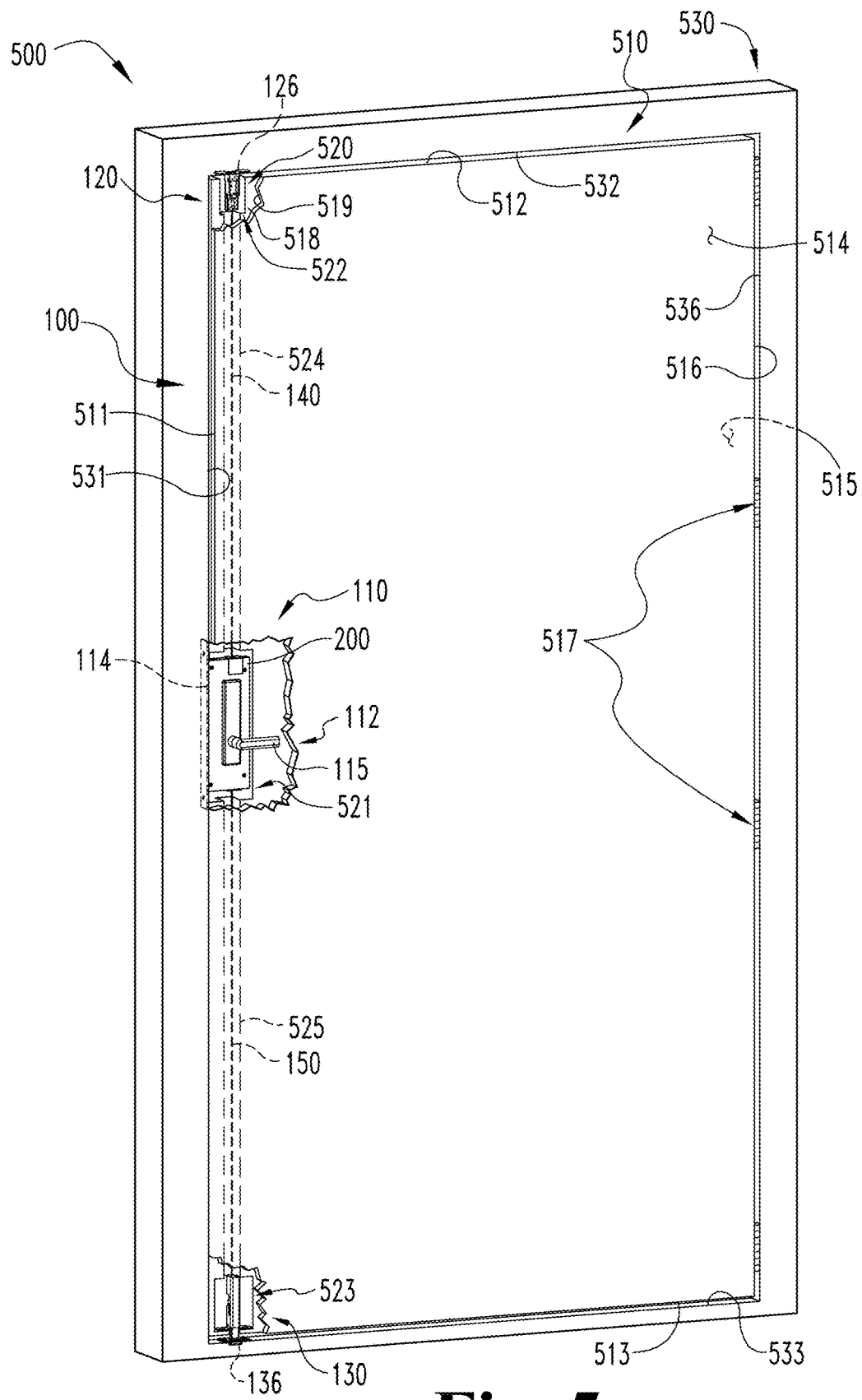
FIG. 5 depicts the illustrative multipoint locking assembly installed in a door assembly.

FIG. 5 depicts the illustrative multipoint latching system 100 along with a door assembly 500. The door assembly 500 comprises a door 510 including a cutout 520, and a door frame 530 to which the door 520 is pivotally mounted. When installed, the system 100 is operable to selectively retain the door 510 in a closed position within the frame 530 by operation of the mortise assembly 110 and latch devices 120, 130.

The door 510 comprises a proximal narrow vertical edge or proximal side 511, an upper surface or top 512, a lower surface or bottom 513, an inner broad side or inner face 514, an outer broad side or outer face 515, a distal narrow vertical edge or distal side 516, and one or more hinges 517 mounted near the distal side 516. In the illustrated form, the door 510 is a wood door, although other forms are contemplated. As will be appreciated by those having skill in the art, the term "wood door" is an industry-accepted term which is used with reference to doors which appear to be made of wood. In contrast, a "steel door" is a door substantially or entirely formed of steel or another metal. Generally, steel doors are substantially hollow, while wood doors are substantially solid. While a wood door may be formed entirely or substantially entirely of wood, the term also encompasses doors which have wooden panels or veneers on at least some of the visible surfaces, while at least a portion of the body of the door is formed of another type of material such as a composite.

In the illustrated form, the wood door 510 includes an inner core comprising a composite 518, and at least one of the visible surfaces (such as the inner and outer faces 514, 515) includes a veneer or panel 519. The composite 518 may, for example, be a fire-retardant composite such as a fire-rated plywood, such that the door 510 may be fire-rated. In the illustrated form, the bulk of the door 510 is formed of the composite 518, and the panel 519 comprises a veneer, which is relatively thin in comparison to the width of the door 510. In other forms, the composite 518 may be relatively thin in comparison to the width of the door 510, and the panel 519 may comprise a greater width than the composite 518.

The cutout 520 includes a center opening 521 formed in the proximal side 511, an upper opening 522 formed in the door top 512, a lower opening 523 formed in the door bottom 513, an upper channel 524 connecting the center opening 521 and the upper opening 522, and a lower channel 525 connecting the center opening 521 and the lower opening 523. In the illustrated form, the channels 524, 525 are substantially enclosed within the door 510. That is to say, the channels 524, 525 are circumferentially surrounded by the composite 518. In certain forms, the channels 524, 525 may be formed by boring into the door 510 through the top 512 and/or the bottom 513. In other forms, the channels 524, 525 may be formed by milling a ravine into the door 510 through the proximal side 511 and subsequently sealing off at least a portion of the ravine, for example with the composite 518, panel 519, or another material. In further embodiments, the channels 524, 525 may not necessarily be enclosed within the door 510, and may, for example, comprise ravines formed in the proximal edge 511.

The illustrated frame 530 includes a proximal side 531, a top portion 532, a floor 533 adjacent the door bottom 513, and a distal side 536 adjacent the door distal side 516. The top strike 126 may be mounted in a recess formed in the top portion 532, and the bottom strike 136 may be mounted in a recess formed in the floor 533. When the door 510 is closed, the door proximal side 511 is adjacent the frame proximal side 531, and the door top 512 is adjacent the frame top portion 532.

With continued reference to FIGS. 1-5, an illustrative method of installing the multipoint locking system 100 in the door assembly 500 will now be described. The installation may begin by positioning the door 510 on a working surface such that the door inner and outer sides 514, 515 are substantially horizontal, and threading the cables 140, 150 through the cutout 520. The cables 140, 150 may comprise a total length greater than the length of the corresponding channels 524, 525 such that, when the cables 140, 150 are threaded through the cutout 520, the end portions 142, 144, 152, 154 are positioned outside of the cutout 520. For example, the upper cable first end portion 142 may extend longitudinally out of the door 510 from the upper opening 522, and the upper cable second end portion 144 may extend laterally out of the door 510 from the center opening 521.

The first end portions 142, 152 may then be coupled to the corresponding latch devices 120, 130, for example by engaging the pegs 143, 153 with the respective coupling portions 121, 131. Additionally, the second end portions 144, 154 may be coupled to the mortise assembly 110, for example by seating the tabs 145, 155 in the spool cutouts 322. Because the cables 140, 150 extend out of the door 510, the cables 140, 150 may be coupled to the mortise assembly 110 and the corresponding latch devices 120, 130 outside the confines of the cutout 520, facilitating installation.

When the cables 140, 150 are coupled to the corresponding latch devices 120, 130 and spool assemblies 300, each of the cables 140, 150 comprises an effective length corresponding to the length of the cable 140, 150 between the spool assembly 300 and the corresponding latch device coupling portion 121, 131. After the cables 140, 150 are connected to the mortise assembly 110 and corresponding latch devices 120, 130 and spool assemblies 300, the top latch device 120 is inserted into the upper opening 522, the bottom latch device 130 is inserted into the lower opening 523, and the chassis 200 is inserted into the center opening 521. The latch devices 120, 130 and chassis 200 may then be secured to the door 510 using appropriate fasteners.

Once the latch devices 120, 130 and chassis 200 are seated in their respective openings, the cables 140, 150 may comprise a certain amount of slack. That is to say, the effective lengths of the cables 140, 150 may be greater than the longitudinal distance between the spool assembly 300 and the corresponding latch device coupling portion 121, 131. Thus, the installation method may further comprise removing the slack by adjusting the effective lengths of the cables 140, 150 using the adjustment devices 330. The adjusting may include inserting an adjustment tool such as an Allen wrench into the hex opening 335 through the chassis opening 203, and rotating the head 334 in the tightening direction. As the worm 332 rotates in the tightening direction, the cable 140 or 150 winds onto the corresponding spool 320, which removes slack from the cable by decreasing the effective length thereof.

As should be appreciated, the slack-removing spool assemblies 300 allow a user to adjust the effective length of the cables 140, 150 to correspond to the distance between the mortise assembly 110 and the latch devices 120, 130 without having to change or modify the total lengths of the cables 140, 150. As such, the multipoint locking system 100 can be utilized with varying positions of the mortise assembly 110 with respect to the latch devices 120, 130, as well as on doors 510 of different heights. In other words, a system 100 including a single set of cables 140, 150 can be used on any of a plurality of doors 510 having different heights and different positions of the mortise assembly 110.

Over-tightening of the cables 140, 150 may cause damage to one or more elements of the system 100. To prevent such damage, the illustrative adjustment device 330 includes a slip clutch 336 configured to limit the amount of torque transmitted from the head 334 to the worm 332. Once the cables 140, 150 comprise the appropriate effective lengths, they become taut. If the installer continues to rotate the head 334 when the cables 140, 150 are taut, the clutch 336 may begin to slip, preventing additional rotation of the worm 332 in the tightening direction and over-tightening of the cables 140, 150.

When the cables 140, 150 have been adjusted to the appropriate effective length, the retaining devices 340 retain the spools 320 in the selected rotational position as described above, preventing inadvertent adjustment of the effective lengths of the cables 140, 150. While the illustrated spool assembly 300 maintains the rotational position of the spool 320 via engagement of the lobed portion 338 and the retaining member 342, it is also contemplated that that the spool 320 may be selectively prevented from rotating in another manner. For example, the spool assembly 300 may include a ratchet device (not illustrated) which allows rotation of the spool 320 in the tightening direction, and prevents rotation of the spool 320 in the loosening direction. In other forms, the head 334 may be axially movable between an unlocked position wherein rotation of the worm 332 is permitted and a locked position wherein rotation of the worm 332 is prevented, and the head 334 may be biased to the locked position. In such forms, the user may have to push the head 334 to the unlocked position (for example using the adjustment tool) prior to rotating the head 334.

Once the cables 140, 150 become taut, the faceplate 114 may be secured to the door proximal side 511, sealing off the chassis openings 203 and enclosing the chassis 200 in the center opening 521. The door 510 may then be mounted in the frame 530, and the inner and outer handle assemblies 112 may be coupled to the chassis 200 to complete installation of the multipoint latching system 100. It may be the case that the effective length of one or both of the cables 140, 150 needs to be adjusted, for example due to faulty installation, or changing operating conditions. In such a case, the faceplate 114 can be removed to expose the adjustment assemblies 330, and the effective lengths of the cables 140, 150 can be adjusted in situ.

With continued reference to FIGS. 1-5, an illustrative method of operating the multipoint locking system 100 and the door assembly 500 will now be described. When installed, the multipoint latching system 100 is operable in a latched configuration wherein the latch devices 120, 130 are in extended or latching states, and an unlatched configuration wherein the latch devices 120, 130 or in retracted or unlatching states. Within the latched configuration, the system 100 is operable in a locked latched configuration wherein the latch devices 120, 130 are retained in their latched states and the door 510 cannot be opened, and an unlocked latched configuration wherein the latch devices 120, 130 can be moved to their retracted states to open the door 510.

Figure 6:
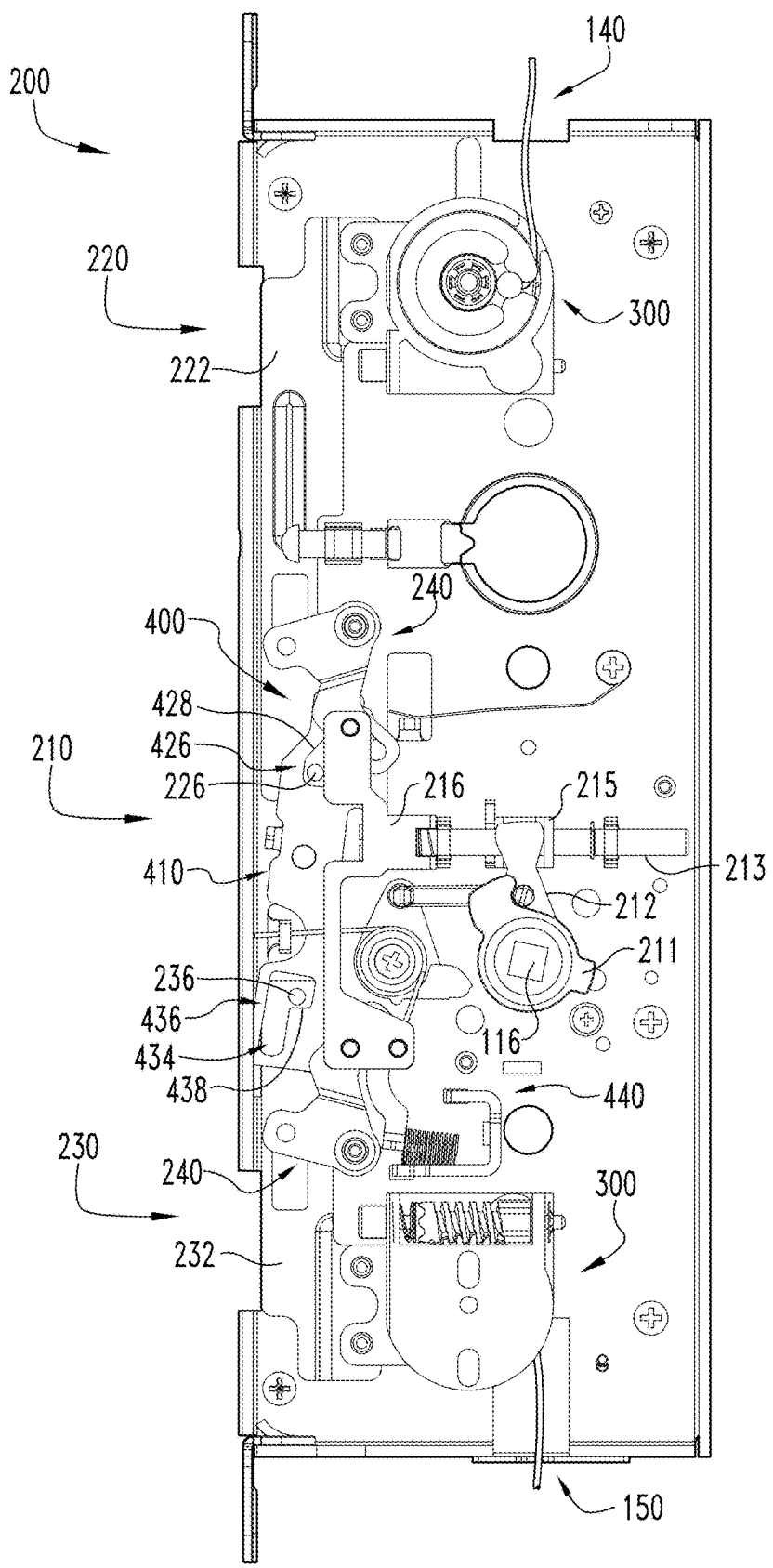
FIG. 6 illustrates the exemplary chassis in an unlocking state and the exemplary hold-open assembly in a holding position.

In the locked latch configuration, the chassis 200 is in an unactuated, extended, or locking state (FIGS. 2 and 4). As a result, the top latch device 120 is in the locked latched state wherein the blocking member 128 prevents the top latch 124 from moving to the unlatched position. In the unlocked latched configuration, the chassis 200 is in an actuated, retracted, or unlocking state (FIG. 6). As a result, the top latch device 120 is in the unlocked latched state wherein the blocking member 128 does not prevent the top latch 124 from moving to the unlatching position. As described in further detail below, when the system 100 is in the unlatched configuration, the hold-open assembly 400 retains the chassis 200 in the actuated or unlocking state.

With specific reference to FIGS. 2 and 4, when the chassis 200 is in the locking state, each of the transmissions 220, 230 is in an extended, unactuated, or locking state, wherein the spool assemblies 300 are positioned adjacent to upper and lower edges 204, 205 of the casing 202. With the chassis 200 in the locking state, actuation of one of the handles 115 rotates the corresponding spindle 116, causing the hub 211 and the pawl 212 to rotate. As the pawl 212 rotates, it engages the bracket 215, urging the drive rod 213 toward a retracted position, or laterally inward. As the drive rod 213 retracts, the head 214 pulls the clevis 216 laterally inward (i.e., toward the hub 211 in a lateral direction). As the clevis 216 moves laterally inward or retracts, the pins 218 pull the bell crank second arms 246 laterally inward, causing the bell cranks 240 to rotate.

As the bell cranks 240 rotate, the first arms 244 retract the link plates 222, 232. That is to say, the link plates 222, 232 are moved longitudinally inward, or toward one another, in response to laterally inward motion or retraction of the clevis 216. In the illustrated form, the chassis 200 translates lateral motion of the clevis 216 to longitudinal motion of the link plates 222, 232 via the rotating or pivoting bell cranks 240. It is also contemplated that the chassis 200 may include alternative features to accomplish this task. For example, the rotating bell cranks 240 may be replaced by a sliding plate including a cam surface such as a diagonal slot, and the link plates 222, 232 may include rivets or pins extending into the diagonal slot.

Retraction or longitudinally inward motion of the link plates 222, 232 causes corresponding longitudinally inward motion of the spool assemblies 300 and the cables 140, 150. Thus, by actuating one of the handles 115, a user can transition the chassis 200 from the locking state to the unlocking state. While other forms are contemplated, in the illustrated form, longitudinal movement comprises vertical movement of the spool assemblies 300. Movement in the longitudinally inward direction comprises downward movement of the upper spool assembly 300 and upward movement of the lower spool assembly 300, and movement in a longitudinally outward direction comprises upward movement of the upper spool assembly 300 assembly and downward movement of the lower spool assembly 300. It is noted that, during retraction of the spool assemblies 300, the spools 320 maintain a substantially fixed rotational position, and rotate only to adjust the effective lengths of the cables 140, 150. In other words, each of the spool assemblies 300 is movable in a first manner (i.e., rotation of the spools 320) to remove slack in the corresponding cable 140, 150, and is movable in a second manner (i.e., in a longitudinally inward direction) to retract the cable 140, 150 to which it is attached.

As the upper cable 140 retracts, the blocking member 128 is moved to the unblocking position, such that the top latch device 120 is in the unlocked latched state. As the lower cable 150 retracts, the bottom bolt 134 is pulled upward to the retracted position, such that the bottom latch device 130 is in the unlatched state. That is to say, when the chassis 200 reaches the unlocking state (FIG. 6), the top latch 124 is free to move to the retracted position, the bottom bolt 134 is in the retracted position, and the door 510 may be opened.

As the door 510 is opened, the top latch 124 moves out of engagement with the top strike 126 and toward the retracted position, for example due to engagement with the protrusion 127, the biasing force of a spring or gravity. Thus, when one of the handles 115 is actuated and the door 510 is open, each of the latch devices 120, 130 is in the retracted state. If the door 510 is closed while the handle 115 remains actuated, the top strike 126 urges the top latch 124 to the extended position, such that the top latch device 120 is in the unlocked latched state. If the handle 115 is then released, the top spring 129 urges the blocking member 128 to the blocking position, and the bottom spring 139 urges the bottom bolt 134 to the extended position. As a result, the system 100 transitions to the locked latched configuration, and the chassis 200 transitions to the unactuated or locking state as the springs 129, 139 urge the transmissions 220, 230 longitudinally outward via the cables 140, 150.

If the user releases the handle 115 with the door 510 open, the spring cages 118 may urge the handle 115 to an unactuated or home position, and the biasing device 219 may urge the pawl 212 to the corresponding unactuated or home positions depicted in FIG. 2. When this occurs, the drive rod 213 no longer retains the clevis 216 in the retracted position, and the clevis 216 no longer counteracts the longitudinally outward biasing forces provided by the springs 129, 139. As a result, the transmissions 220, 230 are urged longitudinally outward.

If the lower transmission 230 were to move longitudinally outward while the door 510 is open, the bottom bolt 134 would extend out of the housing 132 and strike the floor 533, which may damage the bolt 134 and/or the floor 533. Additionally, the bolt 134 may drag along the floor 533 as the user opens or closes the door 510, which may cause additional damage. In the illustrated embodiment, however, the hold-open assembly 400 retains the bottom bolt 134 in the retracted position until the top latch 124 returns to the extended position.

With continued reference to FIGS. 1-6, the operation of the hold-open assembly 400 will now be described. When the chassis 200 is in the unactuated or locking state (FIG. 4), the tilting link 410 is in the releasing position, the upper link plate pin 226 is positioned in the upper channel 424, and the lower link plate pin 236 is positioned in the lower channel 434. When the actuation assembly 210 is actuated, the chassis 200 transitions to the unlocking state (FIG. 6) as described above. As the transmissions 220, 230 retract to the respective actuated or unlocking states, the link plate pins 226, 236 move longitudinally inward from the channels 424, 434 to the enlarged portions 426, 436, and the biasing assembly 440 urges the tilting link 410 toward the holding position (FIG. 6). In other words, the tilting link 410 is operable in the holding position in response to the actuated or unlocking state of the transmissions 220, 230.

As best seen in FIG. 6, when the chassis 200 is in the actuated or unlocking state and the tilting link 410 is in the holding position, the upper link plate pin 226 is positioned in the upper enlarged portion 426 adjacent the ramp 428, and the lower link plate pin 236 is positioned in the lower enlarged portion 436 adjacent the ledge 438. When the handle 115 is released, the transmissions 220, 230 are urged longitudinally outward under the biasing force of the springs 129, 139.

If the handle 115 is released when the latch 124 is in the extended/latching position (e.g., when the door 510 is closed), the top spring 129 moves the blocking member 128 toward the blocking position, pulling the upper transmission 220 longitudinally outward (e.g., upward) to the unactuated or locking state. As the upper link plate 222 moves longitudinally outward, the upper link plate pin 226 engages the ramp 428, urging the tilting link 410 toward the releasing position. In other words, the tilting link 410 is operable in the releasing position in response to the unactuated or locking position of the upper transmission 220. Stated another way, the hold-open assembly 400 is operable in the releasing position in response to the locked latched state of the upper latch device 120. As the tilting link 410 moves toward the releasing position, the ledge 438 is moved out of alignment with the lower link plate pin 236, and the lower channel 434 is moved into alignment with the pin 236. The pin 236 is thus free to travel along the channel 434, and lower link plate 232 is free to move longitudinally outward (e.g., downward) under the biasing force of the lower spring 139. In other words, when the tilting link 410 is in the releasing position, the lower transmission 230 is movable from the unlocking state to the locking state, and the bolt 134 is movable between the unlocking and locking positions.

If the handle 115 is released when the door 510 is open, the blocking member 128 is prevented from moving to the blocking position. Thus, the upper cable 140 and upper transmission 220 will not be pulled longitudinally outward to the locking position, despite the biasing force of the spring 129. The upper link plate pin 236 therefore remains in the upper enlarged portion 426, and does not urge the tilting link 410 to the releasing position as described above. As a result, the ledge 438 remains aligned with the lower link plate pin 236. As the biasing force of the lower spring 139 urges the lower transmission 230 longitudinally outward, the lower link plate pin 236 engages the ledge 438, preventing further extension of the lower transmission 230. That is to say, when the tilting link 410 is in the holding position, the lower transmission 230 is retained in the actuated or unlocking state. Thus, the bottom bolt 134 will remain in the retracted position when the door 510 is open, and will not drag along the floor 533 as the door 510 moves.

While certain conventional multipoint latch systems may provide hold-open assemblies which achieve similar results, such systems often require additional elements in the top latch devices and/or direct connection between the top latch device and the bottom latch device. Additional elements often increase the size of the latch devices, and direct connections between the latch devices require additional connecting members. In either case, the cutout in the door must be enlarged to accommodate the enlarged latch devices and/or additional connecting members, decreasing the structural integrity of the door. The illustrated system 100, however, may not necessarily require additional features in the latch devices 120, 130, and may require only a single connection between the top latch device 120 and the mortise assembly 110 (e.g., the upper cable 140), and a single connection between the bottom latch device 130 and the mortise assembly 110 (e.g., the lower cable 150). Furthermore, the tilting link 410 may comprise a relatively thin width, and may not necessarily increase the overall width of the chassis 200 by an appreciable amount.

As can be seen from the foregoing, during operation of the illustrated system 100, the flexible connectors (e.g., cables 140, 150) need only transmit pulling or tensile forces, and need not transmit pushing or compressive forces. As such, the cables 140, 150 may be bare cables. As will be appreciated by those of skill in the art, the term "bare cable" does not preclude the use of a protective coating on the cable, but rather is used to distinguish from Bowden or push-pull cables, which are sheathed or enclosed.

While the illustrated flexible connectors comprise bare upper and lower cables 140, 150, it is also contemplated that one or more of the cables may comprise any form of unidirectional force transfer member, such as a chain, tether, or rope. Additionally, in certain forms, the system 100 may comprise a single flexible member, for example if only one of the latch devices 120, 130 is utilized. In further forms, the system 100 may include each of the latch devices 120, 130, and one of the latch devices 120, 130 may be connected to the mortise assembly 110 via a unidirectional force transfer member such as a pull cable, while the other of the latch devices 120, 130 may be connected to the mortise assembly 110 via a bidirectional force transfer member such as a Bowden cable or a rigid member.

As should be appreciated, the cables 140, 150 constitute non-rigid mechanisms for causing movement of the latch devices 120, 130 in response to actuation of the handles 115. As should also be appreciated, the adjustment device 330 can be accessed with the cables 140, 150 installed in the door 510 (i.e., without having to remove the spool 320 or the cables 140, 150), thereby allowing for convenient adjustment of the multipoint latching system 100 while the door 510 is mounted to the door frame 530. Additionally, the distance between the latch devices 120, 130 and the mortise assembly 110 does not directly affect the functionality of the system 100, and interconnection of the mortise assembly 110 and the latch devices 120, 130 does not require a direct line of sight and/or precise alignment. Thus, the mortise assembly 110 and the latch devices 120, 130 may have different backsets from the door proximal side 511 and/or from the door inner and outer sides 514, 515. Furthermore, in view of the flexible and non-rigid nature of the system 100 (i.e., the flexibility and non-rigidity provided by the cables 140, 150), if the latch devices 120, 130 and/or the mortise assembly 110 are displaced from their installed locations, the system 100 does not necessarily require re-adjustment. Instead, the flexible and non-rigid nature of the system 100 can alleviate or at least minimize the need for re-adjustment of the latch devices 120, 130 and/or the mortise assembly 110. Moreover, the flexible cable system is easy to install or remove from the door 510, even in instances where the door 510 is installed with a low ceiling clearance. The cable system also provides for direct attachment of the latch devices 120, 130 to the hold-open assembly 400, thereby removing or at least minimizing tolerances from the hold-open function and allowing a cable-based system to control operation of the lower latch device 130. Additionally, concealment of the cables 140, 150 within the door 510 results in a more aesthetic system, serves to protect the internal components and interconnections, and provides an added degree of security by eliminating potential tampering.

While the invention has been illustrated and described in detail in the drawings and foregoing description, the same is to be considered as illustrative and not restrictive in character, it being understood that only the preferred embodiments have been shown and described and that all changes and modifications that come within the spirit of the inventions are desired to be protected. It should be understood that while the use of words such as preferable, preferably, preferred or more preferred utilized in the description above indicate that the feature so described may be more desirable, it nonetheless may not be necessary and embodiments lacking the same may be contemplated as within the scope of the invention, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. A system, comprising:
    an upper latch device;
    a lower latch device; and
    a mortise chassis positioned between the upper latch device and the lower latch device, the mortise chassis comprising an actuation assembly, wherein the mortise chassis is operable to actuate the upper latch device via an upper connector, and wherein the mortise chassis is operable to actuate the lower latch device via a lower connector;
    wherein the mortise chassis is configured to actuate each of the upper latch device and the lower latch device in response to actuation of the actuation assembly, and to maintain actuation of the lower latch device until deactuation of the upper latch device;
    wherein the mortise chassis further comprises:
        a first transmission operably connected with the upper latch device via the upper connector;
        a second transmission operably connected with the lower latch device via the lower connector; and
        a hold-open link having a holding position and a releasing position;
    wherein, with the hold-open link in the holding position, the hold-open link is configured to retain the second transmission in an actuated position while permitting a first transmission deactuating movement, and to move to the releasing position in response to the first transmission deactuating movement; and
    wherein, with the hold-open link in the releasing position, the hold-open link is configured to permit a second transmission deactuating movement to thereby permit deactuation of the lower latch device.

2. The system of claim 1, wherein the hold-open link is mounted to the mortise chassis for pivotal movement relative to the mortise chassis.

3. The system of claim 1, further comprising a rotatable handle operable to actuate the actuation assembly.

4. The system of claim 3, wherein the handle is mounted for rotation about an axis that passes through the mortise chassis.

5. The system of claim 1, wherein each of the upper connector and the lower connector comprises a corresponding and respective cable.

6. The system of claim 1, wherein the hold-open link is configured to remain in the holding position during a portion of the first transmission deactuating movement to thereby retain the second transmission in the actuated position during the portion of the first transmission deactuating movement.

7. The system of claim 1, wherein the actuation assembly comprises a clevis configured to move along a first axis in response to actuation of a manual actuator, and to drive the first transmission and second transmission along second axes when moved along the first axis; and
    wherein the second axes are transverse to the first axis.

8. The system of claim 1, wherein the hold-open link comprises:
    a ledge configured to retain the second transmission in the actuated position while the hold-open link is in the holding position; and
    a ramp configured to urge the hold-open link toward the releasing position in response to the first transmission deactuating movement.

9. The system of claim 1, wherein the hold-open link is biased toward the holding position.

10. A method of operating a remote latch assembly including a mortise chassis connected between an upper latch device and a lower latch device, wherein the mortise chassis comprises a first transmission connected with the upper latch device via an upper connector, and a second transmission connected with the lower latch device via a lower connector, the method comprising:
    in response to actuation of a manual actuator, causing the mortise chassis to actuate each of the upper latch device and the lower latch device;
    while the upper latch device remains actuated, causing the mortise chassis to maintain actuation of the lower latch device, comprising preventing a second transmission deactuating movement while the first transmission remains in a first transmission actuated position;
    in response to deactuation of the upper latch device, causing the mortise chassis to permit deactuation of the lower latch device, comprising permitting the second transmission deactuating movement in response to a first transmission deactuating movement; and
    preventing the second transmission deactuating movement during at least a portion of the first transmission deactuating movement such that the second transmission remains stationary during at least a portion of the first transmission deactuating movement.

11. The method of claim 10, wherein the manual actuator comprises a rotatable handle.

12. The method of claim 10, wherein preventing the second transmission deactuating movement comprises retaining a hold-open link in a hold position such that the hold-open link retains the second transmission in a second transmission actuated position;
    wherein permitting the second transmission deactuating movement comprises moving the hold-open link to a release position in response to the first transmission deactuating movement; and
    wherein the hold-open link remains in the hold position during the at least a portion of the first transmission deactuating movement.

13. The method of claim 12, wherein moving the hold-open link to the release position comprises pivoting the hold-open link.

14. The method of claim 12, wherein moving the hold-open link to the release position comprises causing the first transmission to engage a ramp of the hold-open link to thereby urge the hold-open link toward the release position.

15. The method of claim 10, wherein the remote latch assembly is installed to a door;
wherein the upper latch device remains actuated while the door is open; and
wherein deactuation of the upper latch device occurs in response to closing of the door.

16. A mortise chassis configured for mounting within a mortise cutout of a door, the mortise chassis comprising:
an upper transmission comprising an upper spool and an upper cable wound about the upper spool, wherein the upper transmission has a first actuated position and a first deactuated position;
a lower transmission comprising a lower spool and a lower cable wound about the lower spool, wherein the lower transmission has a second actuated position and a second deactuated position;
an actuation assembly operable to actuate each of the upper transmission and the lower transmission; and
a hold-open link operable to engage each of the upper transmission and the lower transmission, the hold-open link having a hold position and a release position;
wherein the hold-open link in the hold position retains the lower transmission in the second actuated position;
wherein the hold-open link in the release position permits the lower transmission to move from the second actuated position to the second deactuated position;
wherein the upper transmission is configured to retain the hold-open link in the hold position while the upper transmission is in the first actuated position; and
wherein the hold-open link is configured to move from the hold position to the release position in response to movement of the upper transmission to the first deactuated position.

17. The mortise chassis of claim 16, wherein the hold-open link is mounted for pivotal movement between the hold position and the release position.

18. The mortise chassis of claim 16, wherein the hold-open link comprises a ramp configured to drive the hold-open link from the hold position to the release position during deactuation of the upper transmission.

19. A system comprising the mortise chassis of claim 16, the system further comprising a rotatable handle coupled with the actuation assembly such that the actuation assembly actuates each of the upper transmission and the lower transmission in response to rotation of the rotatable handle.

20. A system comprising the mortise chassis of claim 16, the system further comprising:
an upper latch mechanism connected with the upper transmission via the upper cable; and
a lower latch mechanism connected with the lower transmission via the lower cable.

* * * * *